(12) United States Patent
Shirko et al.

(10) Patent No.: US 10,495,895 B2
(45) Date of Patent: Dec. 3, 2019

(54) DISPLAY APPARATUS AND METHOD OF DISPLAYING USING POLARIZERS

(71) Applicant: Varjo Technologies Oy, Helsinki (FI)

(72) Inventors: Evgeny Shirko, Saint-Petersburg (RU); Andrei Razumov, Tver (RU); Oiva Arvo Oskari Sahlsten, Salo (FI)

(73) Assignee: VARJO TECHNOLOGIES OY, Helsinki (FI)

( * ) Notice: Subject to any disclaimer, the term of this patent is extended or adjusted under 35 U.S.C. 154(b) by 150 days.

(21) Appl. No.: 15/622,779

(22) Filed: Jun. 14, 2017

(65) Prior Publication Data

US 2018/0364493 A1   Dec. 20, 2018

(51) Int. Cl.
*G02B 5/30* (2006.01)
*G02B 27/28* (2006.01)
(Continued)

(52) U.S. Cl.
CPC ......... *G02B 27/28* (2013.01); *G02B 27/0018* (2013.01); *G02B 27/0093* (2013.01);
(Continued)

(58) Field of Classification Search
CPC .......... G02B 1/04; G02B 5/30; G02B 5/3083; G02B 27/283; G02B 27/286;
(Continued)

(56) References Cited

U.S. PATENT DOCUMENTS 4,007,979 A    2/1977  Coblitz
4,028,725 A *  6/1977  Lewis ............... G01S 5/163
                                                  348/115
(Continued)

FOREIGN PATENT DOCUMENTS

WO    2008/089417 A2    7/2008
WO    2012/118573 A1    9/2012

OTHER PUBLICATIONS

International Search Report and Written Opinion received for International Patent Application No. PCT/FI2018/050424, dated Aug. 8, 2018, 17 pages.
(Continued)

*Primary Examiner* — William R Alexander
*Assistant Examiner* — Tamara Y. Washington
(74) *Attorney, Agent, or Firm* — Ziegler IP Law Group, LLC

(57) ABSTRACT

A display apparatus and a method of displaying, via the display apparatus. The display apparatus includes an image source for rendering an image, a projection screen facing a direction at a predefined angle to a direction in which the rendered image is projected from the image source, an exit optical element facing the projection screen, a first polarizing element facing the image source and arranged to polarize a projection of the rendered image at a first polarization orientation, a first optical element arranged to reflect the polarized projection towards the projection screen, wherein the projection screen is arranged to unpolarize the polarized projection whilst reflecting the unpolarized projection towards the exit optical element, and a second polarizing element positioned between the projection screen and the exit optical element, arranged to polarize the unpolarized projection at a second polarization orientation. The second polarization orientation is different from the first polarization orientation.

11 Claims, 4 Drawing Sheets

(51) Int. Cl.
 *G02B 27/00* (2006.01)
 *G02B 27/01* (2006.01)
 *G02B 27/10* (2006.01)
 *G03B 21/14* (2006.01)
 *G03B 21/28* (2006.01)
 *H04N 9/31* (2006.01)

(52) U.S. Cl.
 CPC ......... *G02B 27/0172* (2013.01); *G02B 27/10* (2013.01); *G03B 21/147* (2013.01); *G03B 21/28* (2013.01); *H04N 9/317* (2013.01); *H04N 9/3167* (2013.01); *H04N 9/3194* (2013.01); *G02B 2027/0118* (2013.01)

(58) Field of Classification Search
 CPC ............. G02B 5/3025; G02F 1/133536; G02F 1/133528; G02F 1/13362; G02F 1/133606; G05D 1/0038; G06T 15/00
 See application file for complete search history.

(56) References Cited

U.S. PATENT DOCUMENTS

| | | | |
|---|---|---|---|
| 4,670,744 A | 6/1987 | Buzak | |
| 5,808,589 A * | 9/1998 | Fergason | G02B 27/0172 345/8 |
| 9,711,072 B1 * | 7/2017 | Konttori | G03B 21/142 |
| 9,711,114 B1 * | 7/2017 | Konttori | G06F 3/013 |
| 9,905,143 B1 * | 2/2018 | Konttori | G02B 7/04 |
| 9,983,413 B1 * | 5/2018 | Sahlsten | G02B 26/0816 |
| 9,989,774 B1 * | 6/2018 | Sahlsten | G02B 27/0176 |
| 10,371,998 B2 * | 8/2019 | Sahlsten | G02B 27/0172 |
| 2012/0218301 A1 * | 8/2012 | Miller | G02B 27/017 345/633 |

OTHER PUBLICATIONS

Maamari, Robi N., et al., "A mobile phone-based retinal camera for portable wide field imaging", British Journal of Opthalmo, vol. 98, No. 04, Dec. 16, 2013, pp. 438-441.

* cited by examiner

DISPLAY APPARATUS AND METHOD OF DISPLAYING USING POLARIZERS

TECHNICAL FIELD

The present disclosure relates generally to virtual and augmented reality; and more specifically, to display apparatuses comprising image sources, projection screens, optical elements and polarizing elements. Furthermore, the present disclosure also relates to methods of displaying, via the aforementioned display apparatuses.

BACKGROUND

In recent times, there has been rapid advancement in development and use of technologies such as virtual reality, augmented reality, and so forth, for presenting a simulated environment to a user. Specifically, such technologies provide the user with a feeling of complete involvement in the simulated environment by employing contemporary techniques such as stereoscopy. Therefore, such simulated environments enhance the user's perception of reality around him/her. Moreover, such simulated environments relate to fully virtual environments (namely, virtual reality) as well as real world environments including virtual objects therein (namely, augmented reality).

Typically, the user may use a device, such as a virtual reality device or an augmented reality device, for experiencing such simulated environment. Generally, the virtual and augmented reality devices are binocular devices having dedicated display optics for each eye of the user. Examples of virtual reality devices include, head mounted virtual reality devices, virtual reality glasses, and so forth. Furthermore, examples of augmented reality devices include augmented reality headsets, augmented reality glasses, and so forth.

However, conventional virtual and augmented reality devices have certain limitations. For example, optical elements (such as lenses, displays, mirrors, and so forth) in the virtual and augmented reality devices often produce unwanted reflections and scattering of light. Consequently, such unwanted reflections and scattering of light results in loss of contrast, ghost reflections, and visual artifacts (for example, light spots) within the virtual and augmented reality devices.

Therefore, in light of the foregoing discussion, there exists a need to overcome the aforementioned drawbacks associated with conventional virtual and augmented reality devices.

SUMMARY

The present disclosure seeks to provide a display apparatus comprising an image source, at least a first polarizing element and a second polarizing element, a first optical element, a projection screen and an exit optical element. The present disclosure also seeks to provide a method of displaying, via such a display apparatus. The present disclosure seeks to provide a solution to the existing problems of loss of contrast, ghost reflections, and visual artifacts within virtual and augmented reality devices. An aim of the present disclosure is to provide a solution that overcomes at least partially the problems encountered in the prior art, and provides a robust display apparatus that provides good contrast, eliminates ghost reflections, and reduces visual artifacts.

In one aspect, an embodiment of the present disclosure provides a display apparatus comprising:
- an image source for rendering an image;
- a projection screen facing a direction that is at a predefined angle to a direction in which the rendered image is to be projected from the image source;
- an exit optical element facing the projection screen;
- a first polarizing element facing the image source, the first polarizing element being arranged to polarize a projection of the rendered image at a first polarization orientation;
- a first optical element arranged to reflect the polarized projection of the rendered image towards the projection screen, wherein the projection screen is arranged to unpolarize the polarized projection, whilst reflecting the unpolarized projection towards the exit optical element; and
- a second polarizing element positioned in an optical path between the projection screen and the exit optical element, the second polarizing element being arranged to polarize the unpolarized projection at a second polarization orientation, wherein the second polarization orientation is different from the first polarization orientation.

In another aspect, an embodiment of the present disclosure provides a method of displaying, via a display apparatus comprising an image source, at least a first polarizing element and a second polarizing element, a first optical element, a projection screen and an exit optical element, the method comprising:
- rendering an image at the image source;
- using the first polarizing element to polarize a projection of the rendered image at a first polarization orientation;
- using the first optical element to reflect the polarized projection of the rendered image towards the projection screen;
- using the projection screen to unpolarize the polarized projection, whilst reflecting the unpolarized projection towards the exit optical element; and
- using the second polarizing element to polarize the unpolarized projection at a second polarization orientation, the second polarizing element being positioned in an optical path between the projection screen and the exit optical element, wherein the second polarization orientation is different from the first polarization orientation.

Embodiments of the present disclosure substantially eliminate or at least partially address the aforementioned problems in the prior art, and enable reduction in ghost reflections and visual artifacts, thereby improving contrast within the display apparatus.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
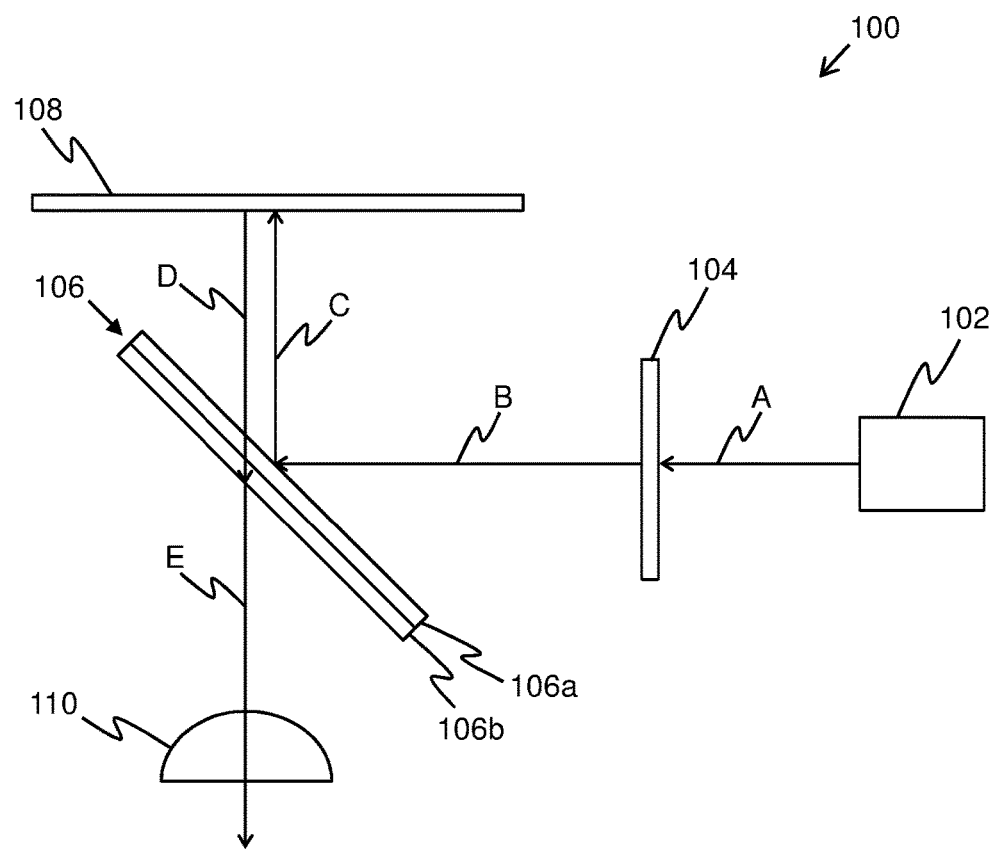
FIGS. 1-3 are exemplary implementations of a display apparatus, in accordance with various embodiments of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a display apparatus comprising:
- an image source for rendering an image;
- a projection screen facing a direction that is at a predefined angle to a direction in which the rendered image is to be projected from the image source;
- an exit optical element facing the projection screen;
- a first polarizing element facing the image source, the first polarizing element being arranged to polarize a projection of the rendered image at a first polarization orientation;
- a first optical element arranged to reflect the polarized projection of the rendered image towards the projection screen, wherein the projection screen is arranged to unpolarize the polarized projection, whilst reflecting the unpolarized projection towards the exit optical element; and
- a second polarizing element positioned in an optical path between the projection screen and the exit optical element, the second polarizing element being arranged to polarize the unpolarized projection at a second polarization orientation, wherein the second polarization orientation is different from the first polarization orientation.

In another aspect, an embodiment of the present disclosure provides a method of displaying, via a display apparatus comprising an image source, at least a first polarizing element and a second polarizing element, a first optical element, a projection screen and an exit optical element, the method comprising:
- rendering an image at the image source;
- using the first polarizing element to polarize a projection of the rendered image at a first polarization orientation;
- using the first optical element to reflect the polarized projection of the rendered image towards the projection screen;
- using the projection screen to unpolarize the polarized projection, whilst reflecting the unpolarized projection towards the exit optical element; and
- using the second polarizing element to polarize the unpolarized projection at a second polarization orientation, the second polarizing element being positioned in an optical path between the projection screen and the exit optical element, wherein the second polarization orientation is different from the first polarization orientation.

The display apparatus described herein may be implemented in small-sized devices such as virtual and augmented reality devices. The described display apparatus suppresses unwanted reflections and scattering of light. Moreover, the described method facilitates the aforesaid suppression of unwanted reflections and scattering of light. Specifically, the first and second polarizing elements facilitate blocking of unwanted light, thereby preventing the unwanted light from reaching user's eyes when the display apparatus is worn by the user in use. As a result, the display apparatus provides better contrast, eliminates ghost reflections, and reduces visual artifacts as compared to conventional virtual and augmented reality devices.

In an embodiment, the image rendered by the image source relates to an image of a virtual scene of a simulated environment (for example, a virtual reality environment) to be displayed via the display apparatus. Specifically, the image may be presented to a user of a device (for example, virtual reality headsets, virtual reality glasses, and the like) comprising the display apparatus, namely when the device is worn by the user. Therefore, the image rendered by the image source is projected onto eyes of the user of the device.

In another embodiment, the image rendered by the image source relates to an image of at least one virtual object. Examples of the at least one virtual object include, but are not limited to, virtual navigation tools, virtual gadgets, virtual messages, virtual entities, and virtual media. Furthermore, in such an embodiment, the image may be overlaid on a projection of a real world image to constitute a visual scene of a resultant simulated environment (for example, an augmented reality environment). According to an embodiment, the real world image relates to an image depicting actual surroundings of the user whereat he/she is positioned. Optionally, the display apparatus further comprises at least one camera to capture the real world image. More optionally, the display apparatus further comprises at least one optical combiner to implement aforesaid overlaying operation and to project the resultant simulated environment onto eyes of a user of a device (for example, augmented reality headsets, augmented reality glasses, and the like) comprising the display apparatus.

According to an embodiment of the present disclosure, the image source relates to equipment configured to facilitate rendering of the image. In one embodiment, the image source comprises at least a context image renderer for rendering a context image and a focus image renderer for rendering a focus image, wherein a projection of the rendered context image and a projection of the rendered focus image together form the projection of the rendered image. In such an embodiment, the image comprises the context image and the focus image. Therefore, the context and focus images may be rendered in order to collectively constitute the rendered image at the image source. Specifically, the context image may relate to a wide image of the virtual scene and/or the at least one virtual object, to be rendered and projected via the display apparatus. Furthermore, the focus image may relate to another image depicting a part (namely, a portion) of the virtual scene and/or the at least one virtual object, to be rendered and projected via the display apparatus. More specifically, the focus image is dimensionally smaller than the context image.

In an embodiment, an angular width of the projection of the rendered context image ranges from 40 degrees to 220 degrees, whereas an angular width of the projection of the rendered focus image ranges from 5 degrees to 60 degrees. According to an embodiment, the angular width of the projection of the rendered context image may be, for example, from 40, 50, 60, 70, 80, 90, 100, 110, 120, 130, 140, 150, 160 or 170 degrees up to 70, 80, 90, 100, 110, 120, 130, 140, 150, 160, 170, 180, 190, 200, 210 or 220 degrees. Similarly, according to another embodiment, the angular width of the projection of the rendered focus image may be, for example, from 5, 10, 15, 20, 25, 30, 35, 40, 45 or 50 degrees up to 15, 20, 25, 30, 35, 40, 45, 50, 55 or 60 degrees.

The angular width of the projection of the rendered context image is larger than the angular width of the projection of the rendered focus image. This may be attributed to the fact that the rendered focus image is typically projected on and around a fovea of an eye, whereas the rendered context image is projected on a retina of the eye, of which the fovea is just a small part.

Throughout the present disclosure, the term 'context image renderer' relates to equipment configured to facilitate rendering of the context image, whereas the term 'focus image renderer' relates to equipment configured to facilitate rendering of the focus image. Optionally, the context image renderer and/or the focus image renderer are implemented by way of at least one projector. Hereinafter, the at least one projector used to implement the context image renderer is referred to as the 'at least one context image projector', for the sake of convenience and clarity. Similarly, the at least one projector used to implement the focus image renderer is referred to as the 'at least one focus image projector'.

Optionally, the context image renderer is implemented by way of at least one context display configured to emit the projection of the rendered context image therefrom. Optionally, the focus image renderer is implemented by way of at least one focus display configured to emit the projection of the rendered focus image therefrom.

As mentioned previously, the first polarizing element of the display apparatus faces the image source and is arranged to polarize the projection of the rendered image at the first polarization orientation. In an embodiment, the first polarizing element relates to an optical element configured to allow only light waves of the first polarization orientation to pass therethrough, whilst blocking light waves of other polarization orientations. Therefore, the first polarization element is configured to perform an optical filtering operation by converting the projection of the rendered image, having undefined or mixed polarization, into the polarized projection of the rendered image having the first polarization orientation. For example, the first polarization element may horizontally polarize the projection of the rendered image.

It is to be understood that throughout the disclosure, the 'projection of the rendered image, having the first polarization orientation' is referred to as the 'polarized projection of the rendered image', for the sake of convenience and clarity.

According to an embodiment, the first polarization element is implemented by way of at least one of: thin film polarizer, Polaroid® polarizing filter, absorptive crystal polarizer, birefringent polarizer. For example, the first polarization element may be implemented by way of a thin film polarizer including a substrate (for example, such as glass, plate, and the like) whereon a thin film of a specialized optical coating is applied. In such a case, the specialized optical coating (for example, such as a dielectric material) may be configured to implement the desired polarization effect.

According to another embodiment, the first polarization element is adjustable to modify the polarized projection of the rendered image. Specifically, such modification may relate to adjusting the first polarization orientation associated with the first polarization element. Therefore, the first polarization element may be adjusted (for example, by application of voltage applied thereto) to adjust the first polarization orientation as per requirement. For example, a voltage V1 may be applied to the first polarization element for polarizing the projection of the rendered image at a polarization orientation X1, and a voltage V2 may be applied to the first polarization element for polarizing the projection of the rendered image at another polarization orientation X2.

Optionally, the first polarization element is movable for adjusting a position of the polarized projection of the rendered image on the first optical element in a desired manner. Optionally, in this regard, the first polarization element is moved by actuators. More optionally, such movement includes at least one of: displacement (horizontally and/or vertically), rotation and/or tilting of the first polarization element. Beneficially, such movement of the first polarization element may be utilized in an event of a change in a gaze direction of the user.

As mentioned previously, the first optical element of the display apparatus is arranged to reflect the polarized projection of the rendered image towards the projection screen. In an embodiment, the first optical element relates to an optical device configured to alter an optical path of the projection of the rendered image. Optionally, the first optical element is configured to implement specular reflection of the polarized projection of the rendered image towards the projection screen. In such an instance, optionally, the first optical element has a smooth surface facing the first polarization element, wherein the smooth surface facilitates the aforesaid specular reflection. Additionally or alternatively, optionally, the first optical element is configured to implement diffused reflection of the polarized projection of the rendered image towards the projection screen.

According to an embodiment, the first optical element has a curved surface facing the first polarizing element. Specifically, the curved surface may be convex (namely, bulging towards the first optical element) or concave (namely, bulging inwards, away from the first optical element). Beneficially, the curved surface of the first optical element facilitates reduction in geometric aberrations within the display apparatus.

According to another embodiment, the first optical element is implemented by way of at least one of: a beam splitter, a semitransparent mirror, a semitransparent reflector, a prism. For example, the semi-transparent mirror for implementing the first optical element may be a pellicle mirror.

As disclosed previously, the projection screen of the display apparatus faces the direction that is at the predefined angle to the direction in which the rendered image is to be projected from the image source. Optionally, the predefined angle is selected so as to allow for reduction of a size of the display apparatus, whilst effectively suppressing unwanted reflections and scattering of light. In an embodiment, the predefined angle ranges from 60 degrees to 120 degrees. In such an embodiment, the predefined angle may be, for example, equal to 60, 65, 70, 75, 80, 85, 90, 95, 100, 105, 110, 115, or 120 degrees. In other embodiments of the present disclosure, the predefined angle may be lesser than 60 degrees (for example, equal to 50, 40, 30, 20, or 10 degrees) or greater than 120 degrees (for example, equal to 130, 140, 150, 160, or 170 degrees).

In an example, the projection screen may face a direction that is at a 90 degrees angle to the direction in which the rendered image is to be projected from the image source. In such a case, the first optical element may be arranged at an angle of 45 degrees with regard to the direction in which the rendered image is to be projected from the image source. In another example, the projection screen may face a direction that is at a 60 degrees angle to the direction in which the rendered image is to be projected from the image source. In such a case, the first optical element may be arranged at an angle of 60 degrees with regard to the direction in which the rendered image is to be projected from the image source.

In an embodiment, the projection screen relates to a display or a surface configured to modify an optical path and optical properties of the polarized projection of the rendered image. Optionally, transmittance and reflectance properties of the projection screen are configured to implement the aforesaid modification for unpolarizing the polarized projection of the rendered image. The polarized projection of the rendered image is incident upon the projection screen, and is reflected away from the projection screen as the unpolarized projection.

According to one embodiment, a front surface of the projection screen facing the exit optical element is configured to implement diffuse reflection of the polarized projection. Optionally, in such a case, the polarized projection of the rendered image is incident on the front surface having diffuse reflection optical properties, and consequently, upon diffuse reflection from the front surface, the polarized projection gets unpolarized. For example, the front surface of the projection screen may be a substantially white matte surface.

According to another embodiment, the front surface of the projection screen is configured to implement specular reflection of the polarized projection. Optionally, in this regard, a polarization retarder (or a waveplate) may be positioned on an optical path between the first optical element and the front surface (having specular reflection optical properties) of the projection screen. Optionally, in such a case, the polarized projection of the rendered image travels through the polarization retarder, which modifies the polarization orientation of the polarized projection. Subsequently, when incident upon the front surface of the projection screen, the modified polarized projection is specularly reflected from the front surface, and travels through the polarization retarder towards the exit optical element. As a result, the polarization retarder modifies the polarization orientation of the reflected modified polarized projection to unpolarize the polarized projection. For example, the front surface of the projection screen may be a substantially reflective surface, such as a clear and polished glass surface, with a polarizing retarder (or a waveplate).

In one implementation, both the context image and the focus image are projected onto the projection screen from a front side, wherein both the context image renderer and the focus image renderer are arranged such that the projections of the rendered context image and the rendered focus image incident upon the first optical element are reflected towards the front surface of the projection screen.

In another implementation, the context image is projected onto the projection screen from a back side, whereas the focus image is projected onto the projection screen from the front side. In such an instance, the context image renderer is arranged facing a back surface of the projection screen, and the focus image renderer is arranged such that the projection of the rendered focus image incident upon the first optical element is reflected towards the front surface of the projection screen. Optionally, in this regard, the projection screen is configured to allow the projection of the rendered context image to pass therethrough, and to reflect the polarized projection of the rendered focus image from the front surface thereof, whilst unpolarizing the polarized projection of the rendered focus image.

In one example, the at least one context display may be arranged facing the back surface of the projection screen. In such a case, the at least one context display may be arranged in proximity to the back surface of the projection screen. In another example, the at least one context image projector may be configured to project the rendered context image onto the back surface of the projection screen.

In yet another implementation, the real world image is projected onto the projection screen from the back side. Optionally, in this regard, the projection screen is configured to allow the projection of the real world image to pass therethrough, and to reflect the polarized projection of the rendered image from the front surface thereof, whilst unpolarizing the polarized projection of the rendered image.

In an embodiment, the projection screen has a curved surface facing the exit optical element. Optionally, in this regard, the aforementioned front surface of the projection screen facing the exit optical element is a curved surface. Furthermore, the aforesaid front surface may be convex (namely, bulging towards the exit optical element) or concave (namely, bulging inwards, away from the exit optical element).

As disclosed previously, the second polarizing element of the display apparatus is arranged to polarize the unpolarized projection at the second polarization orientation. In an embodiment, the second polarization element relates to an optical element configured to allow only light waves of the second polarization orientation to pass therethrough, whilst blocking light waves of other polarization orientations. Therefore, the second polarization element is configured to perform an optical filtering operation by converting the unpolarized projection, having undefined or mixed polarization, into the polarized projection of the rendered image having the second polarization orientation. For example, the second polarization element may vertically polarize the unpolarized projection of the rendered image.

It is to be understood that throughout the disclosure, the 'projection of the rendered image, having the second polarization orientation' is referred to as 'resultant polarized projection of the rendered image', for the sake of convenience and clarity.

According to an embodiment, the second polarization element is implemented by way of at least one of: thin film polarizer, Polaroid® polarizing filter, absorptive crystal polarizer, birefringent polarizer. For example, the second polarization element may be implemented by way of a thin film polarizer including a substrate (for example, such as glass, plate, and the like) whereon a thin film of a specialized optical coating is applied. In such a case, the specialized optical coating (for example, such as a dielectric material) may be configured to implement the desired polarization effect.

According to another embodiment, the second polarization element is adjustable to modify the resultant polarized projection of the rendered image. Specifically, such modification may relate to adjusting the second polarization orientation associated with the second polarization element. Therefore, the second polarization element may be adjusted (for example, by application of voltage applied thereto) to adjust the second polarization orientation as per requirement. For example, a voltage V3 may be applied to the second polarization element for polarizing the unpolarized projection at a polarization orientation X3, and a voltage V4 may be applied to the second polarization element for polarizing the unpolarized projection at another polarization orientation X4.

Optionally, the second polarization element is movable for adjusting a position of the resultant polarized projection of the rendered image on the exit optical element in a desired manner. Optionally, in this regard, the second polarization element is moved by actuators. More optionally, such movement includes at least one of: displacement (horizontally and/or vertically), rotation and/or tilting of the second polarization element. Beneficially, such movement of the second polarization element may be utilized in an event of a change in the gaze direction of the user.

According to an embodiment, the second polarization orientation is substantially orthogonal to the first polarization orientation. Specifically, an angular difference between the second polarization orientation and the first polarization orientation is approximately 90 degrees.

It is to be understood that the aforesaid arrangement of the first and second polarizing elements beneficially suppresses unwanted light waves and visual artifacts (for example, light spots, ghosting of the image rendered by the image source, and the like) within the display apparatus. Specifically, in an example, wherein the second polarization orientation is substantially orthogonal to the first polarization orientation, the suppression of unwanted light waves and visual artifacts is maximum, thereby achieving an optimal contrast of the rendered image.

In one embodiment of the present disclosure, the first optical element and the second polarizing element are implemented by way of a single structure, the first optical element facing the first polarizing element. Optionally, in this regard, the single structure includes both the first optical element and the second polarizing element, bonded or arranged together by suitable techniques employing use of materials/equipment such as adhesives, screws, mechanical clamps, and so forth. More optionally, in the single structure, the first optical element is arranged to face the first polarizing element so that the polarized projection of the rendered image is allowed to be incident on the first optical element, from where the polarized projection is to be reflected towards the projection screen. Furthermore, optionally, in the single structure, the first optical element substantially transmits the unpolarized projection therethrough, towards the second polarization element. In such an instance, the unpolarized projection is incident on the second polarizing element, via the first optical element, and the resultant polarized projection of the rendered image is then transmitted through the second polarizing element.

According to an embodiment, the first optical element, the second polarizing element and the first polarizing element are implemented by way of a prism with polarizing coatings. Optionally, in this regard, the aforesaid prism includes at least one polarizing coating for each of: polarizing the projection of the rendered image at the first polarization orientation, and polarizing the unpolarized projection at the second polarization orientation. Optionally, the at least one polarizing coating employed for polarizing the projection of the rendered image at the first polarization orientation is distinct from the at least one polarizing coating employed for polarizing the unpolarized projection at the second polarization orientation.

Furthermore, in an embodiment, the exit optical element relates to an optical device configured to project the resultant polarized projection of the rendered image towards the eyes of the user of the device (comprising the display apparatus), namely when the device is worn by the user. Optionally, the exit optical element receives the resultant polarized projection of the rendered image from the second polarizing element, and modifies an optical path and/or optical characteristics of the resultant polarized projection prior to directing the resultant polarized projection onto the eyes of the user. In one example, the exit optical element may magnify a size (or angular dimensions) of the resultant polarized projection of the rendered image. In such a case, use of a magnifying optical element allows for use of dimensionally small components within the display apparatus.

Therefore, it is to be understood that physical size (namely, dimensions) of the components (such as the image source, the projection screen, the first and second polarization elements, and/or the first optical element) within the display apparatus does not limit the operation of the display apparatus as described herein.

In one embodiment, the exit optical element is implemented by way of at least one of: a convex lens, a plano-convex lens, a Liquid Crystal (LC) lens, a liquid lens, a Fresnel lens, aspherical lens, achromatic lens. Optionally, the exit optical element has a curved surface facing the projection screen. Specifically, the curved surface may be convex (namely, bulging towards the projection screen) or concave (namely, bulging inwards, away from the projection screen).

According to an embodiment, the display apparatus may further comprise at least one optical element/device, positioned on the optical path of at least one of: the projection of the rendered image (projected from the image source), the polarized projection of the rendered image (polarized by the first polarization element), the unpolarized projection (reflected from the projection screen), the resultant polarized projection of the rendered image (polarized by the second polarization element). Optionally, the at least one optical element/device is arranged for adjusting the optical path and/or the optical properties of the at least one of the aforementioned projections.

For example, a focusing lens positioned on the optical path of the resultant polarized projection of the rendered image may be arranged to adjust a focus thereof. In such a case, the focus of the resultant polarized projection of the rendered image is adjusted to accommodate for diopter tuning, astigmatism correction, and so forth.

Furthermore, examples of the at least one optical element/device include, but are not limited to, lenses, mirrors, prisms, beam splitters, waveguides, and polarizing elements.

Moreover, optionally, the at least one optical combiner of the display apparatus is arranged for combining the projection of the real world image with the resultant projection of the rendered image, so as to create the visual scene of the resultant simulated environment (for example, the augmented reality environment). Optionally, the at least one optical combiner is implemented by way of the second polarizing element.

Optionally, the display apparatus comprises a third polarizing element positioned on the optical path of the projection of rendered image or the optical path of the polarized projection of the rendered image. Optionally, in this regard, the third polarizing element is arranged to adjust an intensity of the aforementioned projections so as to adjust the intensity of the resultant polarized projection of the rendered image that is to be directed towards the eyes of the user by the exit optical element.

Optionally, the display apparatus comprises at least one actuator for moving at least one of: the image source, the projection screen, the exit optical element, the first optical element. Optionally, in this regard, such movement includes at least one of: displacement (horizontally and/or vertically), rotation and/or tilting of the aforementioned components.

Moreover, optionally, the display apparatus further comprises means for detecting a gaze direction and a processor coupled in communication with the means for detecting the gaze direction, wherein the processor is configured to adjust the first polarizing element and/or the second polarizing element, based upon the detected gaze direction.

The processor could be implemented by way of hardware, software, firmware or a combination thereof, suitable for controlling the operation of the display apparatus. Optionally, the processor is configured to control the operation of the display apparatus to process and display (namely, to project) the rendered image onto the eyes of the user. In an instance wherein the display apparatus is used within the device associated with the user, the processor may or may not be external to the device.

Optionally, the processor is communicably coupled to a memory unit that is suitable for storing images to be processed by the processor.

In an embodiment, the means for detecting the gaze direction relates to specialized equipment for tracking a direction of gaze of the eye and the movement of the eye, for example such as eye trackers. An accurate detection of the gaze direction potentially allows the display apparatus to closely implement gaze contingency thereon. Moreover, the means for detecting the gaze direction may or may not be placed in contact with the eye. Examples of the means for detecting a gaze direction include, but are not limited to, contact lenses with sensors, cameras monitoring position of pupil of the eye, and so forth.

In an embodiment, the processor is configured to use the detected gaze direction to determine a region of visual accuracy of the image. It will be appreciated that the term "region of visual accuracy" generally refers to a region of the rendered image whereat the detected gaze direction of the eye is found to be focused. Optionally, the region of visual accuracy is a region of interest (namely, a fixation point) within the image, and is projected onto the fovea of the eye. In an example, in an image depicting a virtual reality coffee shop environment, a region of visual accuracy may be at a virtual menu of food and drinks. Moreover, the region of visual accuracy may be a region of focus within the image. Therefore, it will be appreciated that the region of visual accuracy relates to a region resolved to a much greater detail as compared to other regions of the image, when the image is viewed by the human visual system.

Optionally, the processor is configured to adjust the first polarizing element and/or the second polarizing element, based upon the detected gaze direction, by at least one of: adjusting the first polarization orientation, adjusting the second polarization orientation, moving the first polarizing element, moving the second polarizing element. Such adjustment of first polarizing element and/or the second polarizing element has been described herein previously. Optionally, the aforesaid adjustment of the first polarizing element and/or the second polarizing element is implemented in order to accommodate for shift in the detected gaze direction of the user.

Therefore, it is to be understood that the display apparatus optionally simulates active foveation of the human visual system by detecting gaze direction of the eye and adjusting the components (such as the first polarizing element and/or the second polarizing element) within the display apparatus accordingly. Therefore, the display apparatus implements gaze contingency to imitate the human visual system.

According to an embodiment, the processor is configured to control the image source for masking a region of the context image corresponding to the region of visual accuracy of the image such that transitional area seams (namely, edges) between the region of visual accuracy of the image and a remaining region of input image are reduced, for example minimized. It will be appreciated that the region of visual accuracy of the rendered image corresponds to the projection of the focus image (and the masked region of the context image), whereas the remaining region of the rendered image corresponds to the projection of the context image. Optionally, the masking is performed as a gradual gradation in order to reduce, for example to minimize, the transitional area seams between the superimposed context and focus images (or projections thereof) so that the projection of the rendered image (projected from the image source) appears continuous. For example, the image source may include a context image renderer and a focus image renderer, wherein the context image renderer and the focus image renderer are implemented by way of a context display and a focus display, respectively. In such a case, the processor may significantly dim pixels of the context image corresponding to the region of visual accuracy of an image (for example, an image of a virtual beach environment), and gradually reduce an amount of dimming of the pixels with an increase in a distance thereof from the region of visual accuracy of the image.

Optionally, masking the region of the context image that substantially corresponds to the region of visual accuracy of the image is performed using linear transparency mask blend of inverse values between the context image and the focus image at the transition area, stealth (namely, camouflage) patterns containing shapes naturally difficult for detection by the eyes of the user, and so forth. If an alignment of the projections of the rendered context and focus images is improper, namely has discontinuities, then the projection of the image (such as the image of the virtual scene of the simulated environment) would also appear improper. Therefore, beneficially, the displayed image using the described display apparatus appears continuous due to proper combination of its constituent projections (namely, the projections of the rendered context and focus images).

The present disclosure also relates to the method as described above. Various embodiments and variants disclosed above apply mutatis mutandis to the method.

DETAILED DESCRIPTION OF THE DRAWINGS

Figure 2:
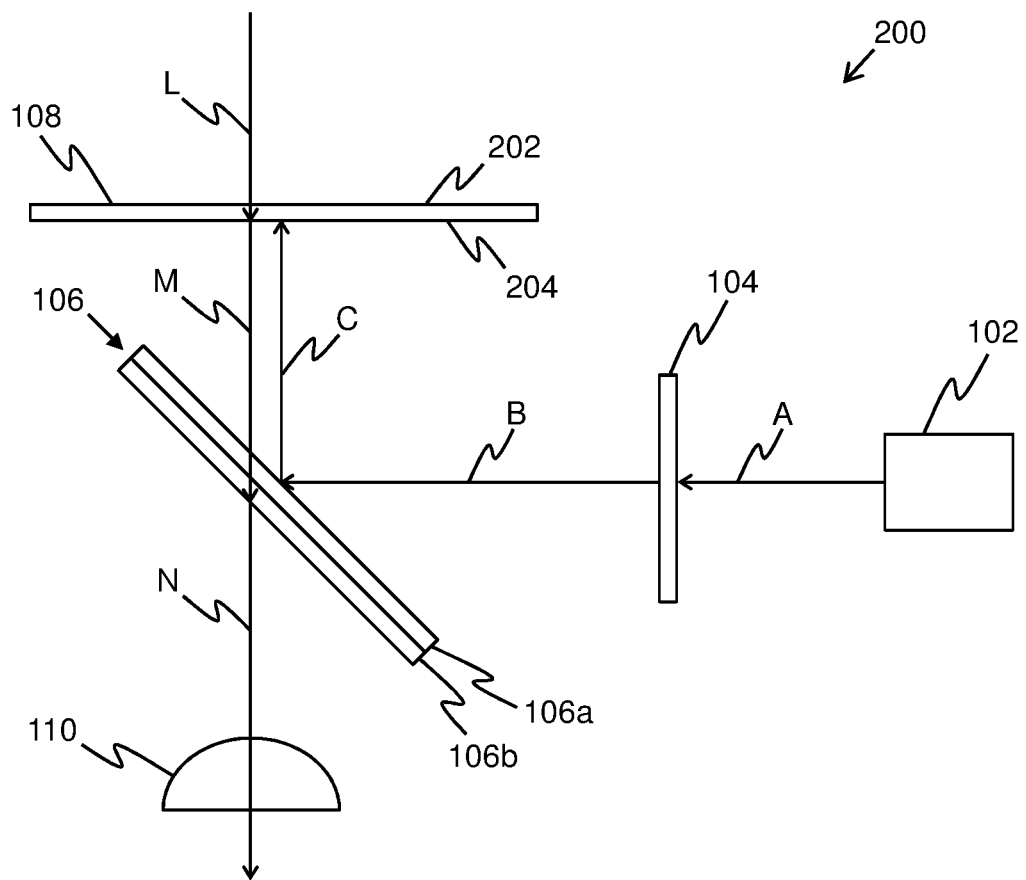

Referring to FIGS. 1-2, illustrated are exemplary implementations of a display apparatus, in accordance with various embodiments of the present disclosure. It is to be understood by a person skilled in the art that the FIGS. 1-2 include simplified arrangements for implementation of the display apparatus for the sake of clarity, which should not unduly limit the scope of the claims herein. The person skilled in the art will recognize many variations, alternatives, and modifications of embodiments of the present disclosure.

Referring to FIG. 1, illustrated is an exemplary implementation of a display apparatus 100, in accordance with an embodiment of the present disclosure. The display apparatus 100 includes an image source 102 for rendering an image, a first polarizing element 104 facing the image source 102, a first optical element 106a, a second polarizing element 106b, a projection screen 108, and an exit optical element 110. In the display apparatus 100, the projection screen 108 faces a direction that is at a predefined angle to a direction in which the rendered image is to be projected from the image source 102, while the exit optical element 110 faces the projection screen 108. With reference to FIG. 1, the projection screen 108 faces a direction that is substantially at 90 degrees to the direction in which the rendered image is to be projected from the image source 102. Furthermore, in the exemplary display apparatus 100, the first optical element 106a and the second polarizing element 106b are implemented by way of a single structure 106. As shown, a projection of the rendered image is depicted by a ray A. The first polarizing element 104 is arranged to polarize the projection of the rendered image at a first polarization orientation. As shown, a polarized projection of the rendered image is depicted by a ray B. Further, the first optical element 106a is arranged to reflect the polarized projection of the rendered image towards the projection screen, as depicted by a ray C. The projection screen 108 is arranged to unpolarize the polarized projection, whilst reflecting the unpolarized projection towards the exit optical element 110. The unpolarized projection is depicted by a ray D. The second polarizing element 106b is positioned in an optical path between the projection screen 108 and the exit optical element 110, and is arranged to polarize the unpolarized projection at a second polarization orientation, wherein the second polarization orientation is different from the first polarization orientation. The polarized projection at the second polarization orientation (namely, the resultant polarized projection of the rendered image) is depicted as a ray E. As shown, the resultant polarized projection of the rendered image is received by the exit optical element 110 and is directed towards eyes of a user.

Referring to FIG. 2, illustrated is an exemplary implementation of a display apparatus 200, in accordance with another embodiment of the present disclosure. The display apparatus 200 includes the image source 102 for rendering an image, the first polarizing element 104 facing the image source 102, the first optical element 106a, the second polarizing element 106b, the projection screen 108, and the exit optical element 110. In the display apparatus 200, the projection screen 108 faces a direction that is at a predefined angle (for example, 90 degrees) to a direction in which the rendered image is to be projected from the image source 102, while the exit optical element 110 faces the projection screen 108. Furthermore, in the exemplary display apparatus 100, the first optical element 106a and the second polarizing element 106b are implemented by way of the single structure 106. As shown, a real world image is projected onto a back surface 202 of the projection screen 108. Specifically, the projection of the real world image is depicted by a ray L. In the display apparatus 200, the projection screen 108 is configured to allow the projection of the real world image to pass therethrough and to reflect the polarized projection of the rendered image from a front surface 204 thereof. Therefore, a ray M depicts both the projection of the real world image and the unpolarized projection of the rendered image that is reflected from the projection screen 108. In the display apparatus 200, the projection of the real world image is combined with the resultant projection of the rendered image, wherein such a combined projection is depicted by a ray N.

Figure 3:
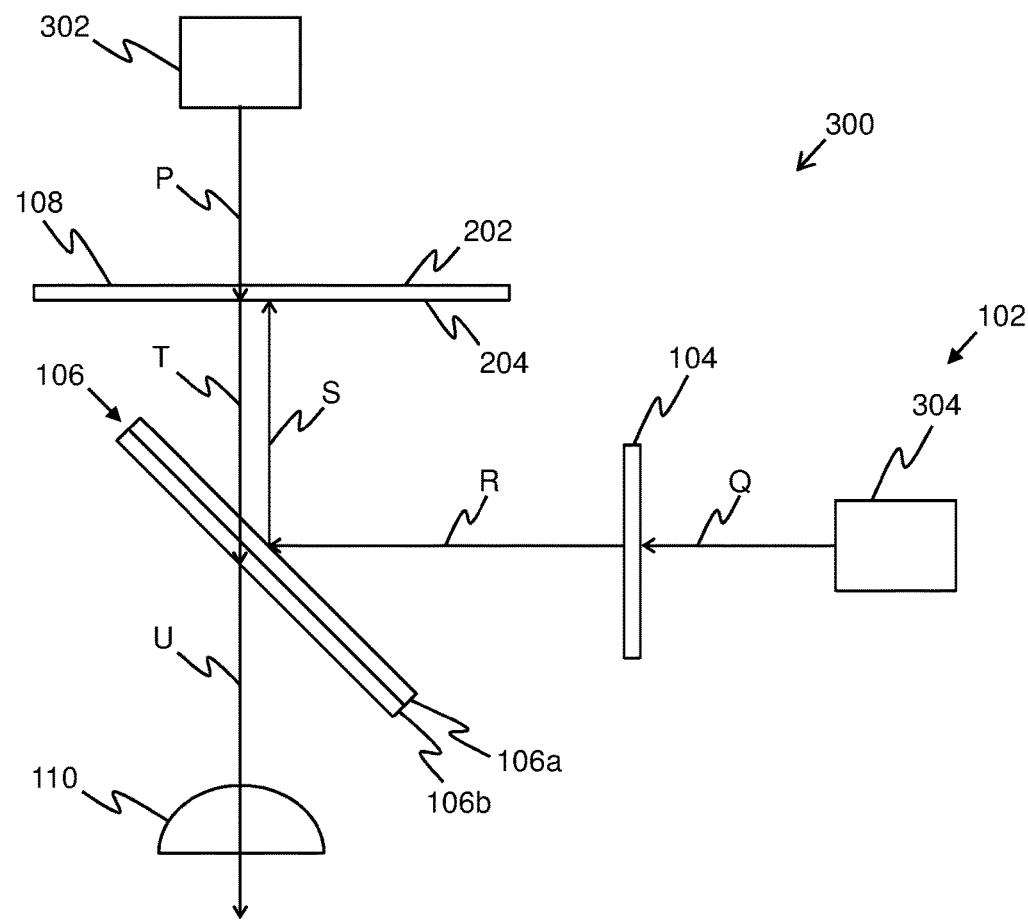

Referring next to FIG. 3, illustrated is an exemplary implementation of a display apparatus 300, in accordance with yet another embodiment of the present disclosure. The display apparatus 300 includes an image source 102, the first polarizing element 104 facing the image source 102, the first optical element 106a, the second polarizing element 106b, the projection screen 108, and the exit optical element 110. Specifically, the image source 102 comprises a context image renderer 302 and a focus image renderer 304 for rendering a context image and a focus image, respectively. A projection of the rendered context image is depicted by a ray P, whereas a projection of the rendered context image is depicted by a ray Q. Furthermore, a polarized projection of the rendered focus image is depicted by a ray R, and a reflected polarized projection of the rendered focus image is depicted by a ray S.

In operation, the context image renderer 302 projects the context image onto the back surface 202 of the projection screen 108. Specifically, the projection of the rendered context image is depicted by a ray P. In the display apparatus 200, the projection screen 108 is configured to allow the projection of the rendered context image to pass therethrough and to reflect the polarized projection of the rendered focus image from the front surface 204 thereof. Therefore, a ray T depicts both the projection of the rendered context image and the unpolarized projection of the rendered focus image that is reflected from the projection screen 108. Furthermore, a ray U depicts the projection of the rendered context image and the resultant polarized projection of the rendered focus image.

Figure 4:
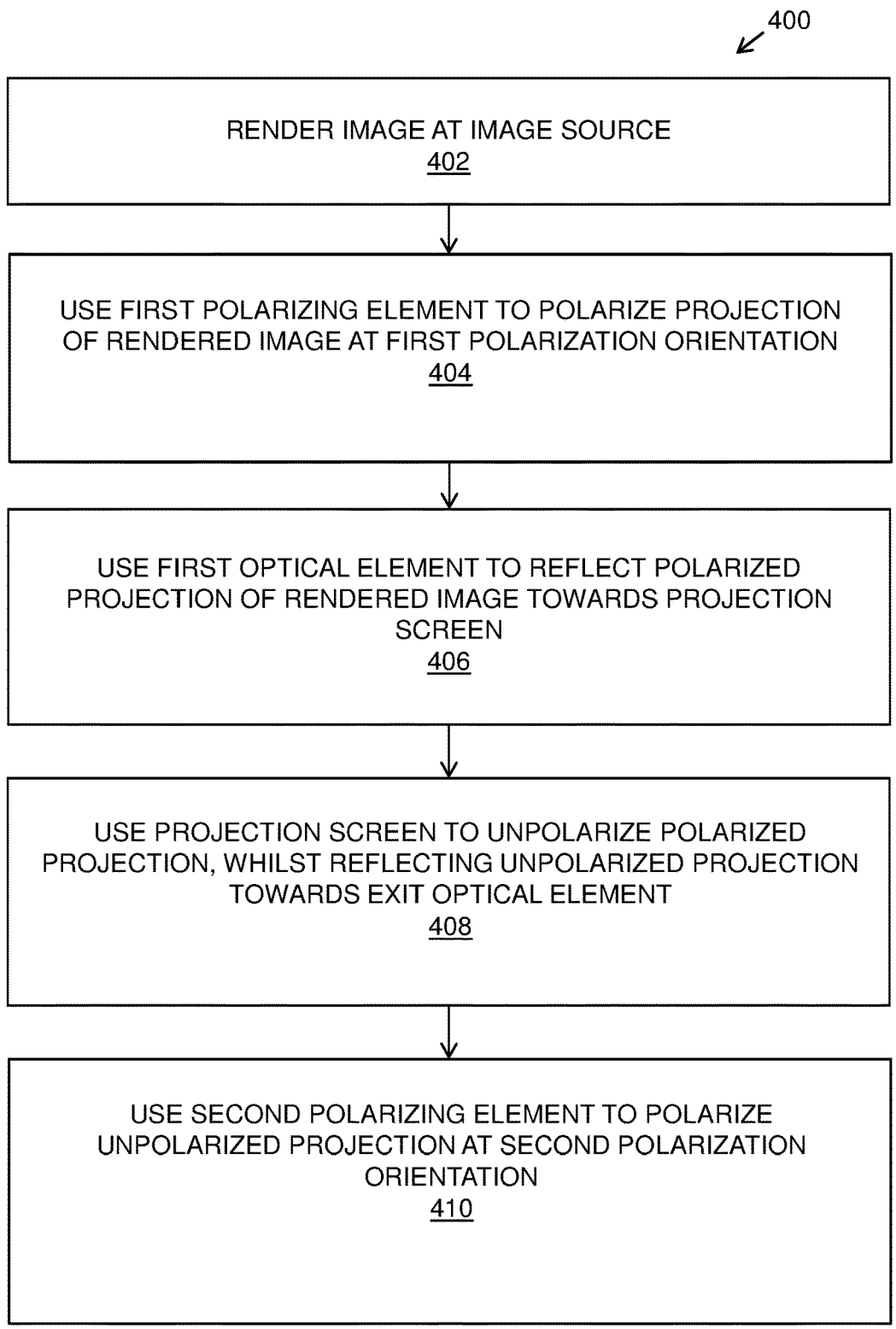
FIG. 4 illustrates steps of a method of displaying via the display apparatus, in accordance with an embodiment of the present disclosure.

Referring to FIG. 4, illustrated are steps of a method 400 of displaying via a display apparatus (such as the display apparatus 100 of FIG. 1), in accordance with an embodiment of the present disclosure. At step 402, an image is rendered at an image source. At step 404, a first polarizing element is used to polarize a projection of the rendered image at a first polarization orientation. At step 406, a first optical element is used to reflect the polarized projection of the rendered image towards a projection screen. At step 408, the projection screen is used to unpolarize the polarized projection, whilst reflecting the unpolarized projection towards the exit optical element. At step 410, the second polarizing element is used to polarize the unpolarized projection at a second polarization orientation, the second polarizing element being positioned in an optical path between the projection screen and the exit optical element, wherein the second polarization orientation is different from the first polarization orientation The steps 402 to 410 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A display apparatus comprising:
   an image source (102) for rendering an image;
   a projection screen (108) facing a direction that is at a predefined angle to a direction in which the rendered image is to be projected from the image source (102);
   an exit optical element (110) facing the projection screen (108) through which a projection is directed;
   a first polarizing element (104) facing the image source (102), the first polarizing element (104) being arranged to polarize a projection of the rendered image at a first polarization orientation;
   a first optical element (106a) arranged to reflect the polarized projection of the rendered image towards the projection screen (108), wherein the first polarizing element is interposed between the image source and the first optical element, and wherein the projection screen (108) is arranged to unpolarize the polarized projection, whilst reflecting the unpolarized projection towards the exit optical element (110); and
   a second polarizing element (106b) positioned in an optical path between the projection screen (108) and the exit optical element (110), the second polarizing element (106b) being arranged to polarize the unpolarized projection at a second polarization orientation, wherein the second polarization orientation is different from the first polarization orientation.

2. The display apparatus of claim 1, wherein the second polarization orientation is substantially orthogonal to the first polarization orientation.

3. The display apparatus of claim 1, wherein the first optical element (106a) is implemented by way of at least one of: a beam splitter, a semitransparent mirror, a semitransparent reflector, a prism.

4. The display apparatus of claim 1, wherein the first optical element (106a) and the second polarizing element (106b) are implemented by way of a single structure (106), the first optical element (106a) facing the first polarizing element (104).

5. The display apparatus of claim 1, wherein the first optical element (106a), the second polarizing element (106b) and the first polarizing element (104) are implemented by way of a prism with polarizing coatings.

6. The display apparatus of claim 1, wherein the projection screen (108) has a curved surface facing the exit optical element (110).

7. The display apparatus of claim 1, wherein the exit optical element (110) has a curved surface facing the projection screen (108).

8. The display apparatus of claim 1, wherein the first optical element (106a) has a curved surface facing the first polarizing element (104).

9. The display apparatus of claim 1, wherein the image source (102) comprises at least a context image renderer for rendering a context image and a focus image renderer for rendering a focus image, wherein a projection of the rendered context image and a projection of the rendered focus image together form the projection of the rendered image.

10. The display apparatus of claim 9, wherein the context image renderer and/or the focus image renderer are implemented by way of at least one projector.

11. The display apparatus of claim 1, further comprising:
    means for detecting a gaze direction; and
    a processor coupled in communication with the means for detecting the gaze direction, wherein the processor is configured to adjust the first polarizing element (104) and/or the second polarizing element (106b), based upon the detected gaze direction.

* * * * *